United States Patent

[11] 3,622,532

| [72] | Inventors | Gunter Kolb<br>Cologne, Stammheim;<br>Gerhard Balle, Cologne, Flittard, both of<br>Germany |
|---|---|---|
| [21] | Appl. No. | 824,306 |
| [22] | Filed | May 13, 1969 |
| [45] | Patented | Nov. 23, 1971 |
| [73] | Assignee | Farbenfabriken Bayer Aktiengesellschaft<br>Leverkusen, Germany |
| [32] | Priority | June 7, 1968 |
| [33] | | Germany |
| [31] | | P 17 70 592.9 |

[54] CROSS-LINKABLE HOMO- AND COPOLYMERS
2 Claims, No Drawings

[52] U.S. Cl. ........................................................ 260/29.6 H,
260/29.6 HN, 260/77.5

[51] Int. Cl. .......................................................... C08f 37/14,
C08f 37/04, C08f 37/00
[50] Field of Search ............................................ 260/29.6 H,
29.6 HN, 77.5

[56] References Cited
FOREIGN PATENTS

| 1,278,064 | 9/1968 | Germany |
| 1,020,142 | 2/1966 | Great Britain |

*Primary Examiner*—Melvin Goldstein
*Attorney*—Connolly and Hutz

ABSTRACT: Cross-linked homopolymers and copolymers based on $\alpha$, $\beta$-unsaturated acylaminomethylene carbamic acid esters, their utility as binders for pigments, fleeces and textile materials, as paper auxiliaries and as coating agents and process of producing the same by radical polymerization.

CROSS-LINKABLE HOMO- AND COPOLYMERS

This invention relates to spontaneously cross-linking polymers and to a process for their production.

It is known that polymers containing the group $$-CONH-CH_2-NH-COOR$$

(R = alkyl, cycloalkyl, aralkyl, aryl)
repeatedly in the polymer molecule can be converted into insoluble products at temperatures below 100° C., irrespective of the pH value of the medium.

It is also known that polymers such as these, in the form of aqueous copolymer dispersions, can be used as binders for fiber fleeces, as auxiliaries for dressing leather and as coating agents (cf. Belgian Pat. Specifications Nos. 654,817; 691,833 and 699,893). These polymers are of particular importance in the production of insoluble coatings on substrates which are sensitive both to acids and to elevated temperatures such as, for example, cellulose materials or iron. In this connection, it has been found that the degree of cross-linking in alkaline media is not altogether satisfactory, above all in cases where relatively low-temperatures are used.

This invention related to a process for the production by radical polymerization of spontaneously cross-linking polymers based on α,β-unsaturated acylaminomethylene carbamic acid esters and, optionally, at least one other copolymerizable monomer with at least one radically polymerizable carbon-carbon double bond, in which process monomers corresponding to the general formula:

$$CH_2=C-CONH-CH_2-NH-COOR$$
$$\quad\quad |$$
$$\quad\quad R'$$

in which R represents an alkyl or cycloalkyl radical in which at least one hydrogen atom is replaced by halogen, and R' represents H or CH$_3$,
are used as α,β-unsaturated acylaminomethylene carbamic acid esters.

In the above formula, R preferably represents chloralkyl having from two to six carbon atoms and from one to three chlorine atoms or bromoalkyl having from two to six carbon atoms and from one to three bromine atoms.

The invention also relates to the homopolymers and copolymers themselves which contain polymerized units of the α,β-unsaturated acylaminomethylene carbamic acid esters whose formula is shown above. The aqueous copolymer dispersions are of the greatest importance.

Examples of monomers corresponding to the general formula:

$$CH_2=C-CONH-CH_2-NH-COOR$$
$$\quad\quad |$$
$$\quad\quad R'$$

include those in which

R=—CH$_2$—CH$_2$Cl        R=—CH(CH$_3$)—CH$_2$Cl
—CH$_2$—CHCl$_2$            —CH(CH$_3$)—CH$_2$Br
—CH$_2$—CCl$_3$               —CH(CH$_2$Cl)—CH$_2$Br
—CH$_2$—CH$_2$Br            —CH$_2$—(CH$_2$)$_2$—CH$_2$Cl
—CH$_2$CHCl—CH$_3$         —CH(C$_2$H$_5$)—CH$_2$Cl
—CH$_2$—CH$_2$—CH$_2$Cl     —CH(CH$_3$)—CH$_2$—CH$_2$Cl
—CH$_2$—CH$_2$—CH$_2$Br     —CH(C$_2$H$_5$)—CH$_2$Br
R=—CH$_2$—CHCl—CH$_2$Cl   R=—CH$_2$—(CH$_2$)$_3$—CH$_2$Cl
—CH$_2$—CHBr—CH$_2$Br     —CH—(CH$_2$)$_4$—CH$_2$Cl
and R' represents H or CH$_3$.

In the context of this invention, the following are examples of the other copolymerizable monomers:

a. α,β-unsaturated carboxylic acids with from three to five carbon atoms such as acrylic or methacrylic acid;
b. esters of α,β-unsaturated CHCl—acids with from three to five carbon atoms, in particular of acrylic acid and methacrylic acid, with saturated aliphatic or cycloaliphatic alcohols containing from one to 20 carbon atoms, for example methylmethacrylate, ethylmethacrylate, dodecylmethacrylate, methyl acrylate, stearyl acrylate, 2-hydroxyethyl(meth)acrylate, 2-hydroxypropyl(meth)acrylate, 2-aminoethyl(meth)acrylate hydrochloride, preferably methyl methacrylate, ethyl acrylate, butyl acrylate, 2-hydroxypropyl(meth)acrylate and 2-amino(meth)acrylate hydrochloride;
c. amides of α,β-unsaturated carboxylic acids with from three to five carbon atoms such as acrylic amide of methacrylic amide, their methylol compounds and methylol ethers, preferably methacrylic acid amide and methacrylic acid amide-N-methylol methyl ether;
d. nitriles of α,β-unsaturated carboxylic acids containing from three to five carbon atoms such as acrylonitrile or methacrylonitrile, preferably acrylonitrile;
e. aliphatic vinyl compounds such as vinyl ethers, e.g. vinyl ethyl ether, vinyl esters, vinyl ketones, vinyl halides, vinyl acetate, vinyl propionate, chlorovinyl acetate, vinyl chloride, preferably vinyl acetate;
f. aromatic vinyl compounds such as styrene, vinyl toluene, α-methyl styrene and heterocyclic vinyl compounds such as 2-vinyl pyrrolidone, 2-vinyl pyridine, preferably styrene;
g. vinyldene compounds, vinylidene chloride in particular;
h. conjugated diolefins, in particular those of an aliphatic nature containing from four to six carbon atoms, such as butadiene, isoprene, 2,3-dimethyl-butadiene, 2-chlorobutadiene, preferably butadiene and isoprene;
i. α-mono-olefins and their substituted products such as ethylene and propylene; and
j. divinyl compounds such as divinyl benzene and glycoldi(meth) acrylate.

The monomers according to the invention may be homopolymerized or copolymerized with other radically polymerizable monomers by polymerization process known per se in bulk, in solution, in emulsion or in suspension in the presence of conventional polymerization catalysts forming free radicals. Copolymerization may also be carried out by the special process known as graft copolymerization.

Suitable polymerization catalysts include inorganic per compounds such as potassium or ammonium persulfate, hydrogen peroxide, percarbonates, organic per compounds such as acyl peroxides, for example benzoyl peroxide, and lauroyl peroxide, alkyl peroxides such as ditert.-butyl peroxide and alkyl hydroperoxides such as tert.-butyl hydroperoxide, cumene hydroperoxide and p-menthane hydroperoxide. The inorganic or organic per compounds are with advantage used in conjunction with reducing agents. Suitable reducing agents include, for example, alkali metal or ammonium bisulphites, sodium formaldehyde sulfoxylate triethanolamine and tetraethylene pentamine.

The catalysts may be used in the usual quantities of from 0.05 to 10 percent by weight, based on the amount of monomers used.

The polymerization temperatures are governed by the catalyst combinations used and are preferably in the range of from 0° to 80° C.

The chain length regulators such as long-chain mercaptans, diisopropyl xanthogen disulfide nitro compounds and so on, may be used during polymerization to influence molecular weight.

In one preferred embodiment, copolymerization is carried out in aqueous dispersion, in which case the monomers according to the invention are intended to contribute between 0.5 and 30 percent by weight, and preferably between 0.5 and 10 percent by weight, to the total monomer content. It is possible either to polymerize all the monomers at once, or only to introduce some of the monomer mixture and then to add the rest after the reaction has started.

Suitable emulsifiers include anionic and cationic or nonionic emulsifiers or combinations thereof.

Suitable anion-active emulsifiers include, for example, alkali metal salts or ammonium salts of long-chain mono- or polycarboxylic acids such as fatty acids or resin acids, in particular those containing from 10 to 20 carbon atoms, semiesters of saturated or unsaturated dicarboxylic acids with long-chain monohydric alcohols, salts of acid alkyl sulfuric acid esters, alkali metal salts of long-chain alkyl sulfonic acids and alkyl aryl sulfonic acids, salts of sulfonated oils or salts of fatty acid condensation products with hydroxy and amino alkyl carboxylic acids or sulfonic acids, salts of sulfonated ethylene oxide adducts and so on.

Suitable cation-active emulsifiers include, for example, salts of alkyl, aryl, aralkyl or resin amines with inorganic or organic acids of the type:

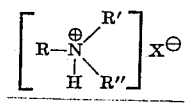

in which R represents a long-chain alkyl radical, while R' and R" preferably represent a short-chain alkyl radical, also salts of quarternary ammonium compounds with a long-chain alkyl radical, in particular a radical containing from 10 to 20 carbon atoms.

Examples of nonionic emulsifiers include reaction products of phenols with from 5 to 50 mols of ethylene oxide and reaction products of fatty alcohols with alkylene oxides.

The emulsifiers are with advantage used in quantities of from 1 to 20 percent by weight, based on total monomer.

The polymers and copolymers obtained by the process according to the invention contain reactive groups which can be reacted with one another at any pH values, i.e. both in the acid and in the neutral or alkaline range. The polymers are thus spontaneously cross-linked, i.e. there is no need for the additional use of a compound which promotes cross-linking. Surprisingly, the spontaneous cross-linking reaction also takes place in alkaline media at temperatures as low as room temperature so that insoluble films can be obtained simply by drying the aqueous copolymer dispersions. The swelling properties of these films in many solvents are considerably improved in comparison with films of conventional polymer dispersions.

The polymers according to the invention may be used as binders for pigments, fleeces and textile materials and as paper auxiliaries. They may also be used as coating agents for coating a variety of materials such as, for example, leather, wood, concrete, masonry, asbestos cement slabs and so on. They may be used with particular advantage in cases where acid- and heat-sensitive materials are to be coated.

COMPARISON TEST 1

Five g. of the sodium salt of a long-chain alkyl sulfonic acid are dissolved in 125 ml. of water in a spherical flask equipped with a stirring mechanism, a dropping funnel and a reflux condenser. About 20 percent by weight of a mixture of 95 g. of butyl acrylate and 5 g. of methacrylamidomethylene carbamic acid ethyl ester are added to the solution which is then heated to 45° C. The air inside the apparatus is displaced by nitrogen. A solution of 0.3 g. of sodium pyrosulfite in 5 ml. of water and a solution of 1.0 g. of potassium persulfate in 20 ml. of water are then successively added, polymerization beginning after a short time. There is a rise in temperature of about 10° to 15° C. The remaining 80 percent by weight of the monomer mixture is added dropwise sufficiently quickly for the maximum temperature reached to be largely maintained, the product being subsequently stirred at 45° C. After 12 to 15 hours, the dispersion has a solids content of 40 percent by weight, corresponding to a conversion of 100 percent. The dispersion is adjusted to pH 9 with 1N sodium hydroxide and cast into films. The films dried at room temperature are covered with dimethyl formamide for 24 hours. The percentage of swelling is then measured by weighing the films after they have been squeezed out. The percentage of swelling is given by the quotient:

$$\text{Percent swelling} = \frac{(\text{Swollen weight} - \text{dry weight}) \cdot 100}{\text{Dry weight}}$$

The swelling of the films is so great that they decompose into a jellylike mass which cannot be weighed.

EXAMPLE 1 polymerization

The following aqueous copolymer emulsions with a solids content of 40 percent by weight were prepared as in comparison test 1:

Polymer A: 95 percent by weight of butyl acrylate,
  5 percent by weight of methacrylamidomethylene carbamic acid-2-chloroethyl ester;
Polymer B: 95 percent by weight of butyl acrylate,
  5 percent by weight of methacrylamidomethylene carbamic acid-1-chloro-2-propyl ester;
Polymer C: 95 percent by weight of butyl acrylate,
  5 percent by weight of methacrylamidomethylene carbamic acid-1-bromo-2-propyl ester;
Polymer D: 95 percent by weight of butyl acrylate,
  5 percent by weight of methacrylamidomethylene carbamic acid-1-chloro-2-butyl ester.

The following swellings are obtained under the conditions described in comparison test 1:

| Polymer | A | B | C | O |
|---|---|---|---|---|
| Swelling (in %) | 400 | 415 | 345 | 156 |

EXAMPLE 2

The following aqueous copolymer emulsions with a solids content of 40 percent were prepared by the process described with reference to comparison test 1:

| | |
|---|---|
| Polymer E: (Comparison Test 2) | 42.8% by weight of ethyl acrylate. |
| | 42.8% of butyl acrylate, |
| | 9.4% by weight of acrylonitrile, |
| | 5.0% by weight of methacrylamidomethylene carbamic acid ethyl ester; |
| Polymer F: (Invention) | 42.3% by weight of ethyl acrylate, |
| | 42.3% by weight of butyl acrylate, pyrosulfite |
| | 9.4% by weight of acrylonitrile, |
| | 6.0% by weight of methacrylamidomethylene carbamic acid-2-chloroethyl ester; |
| Polymer G: (Invention) | 41.4% by weight of ethyl acrylate, |
| | 41.4% by weight of butyl acrylate, |
| | 9.2% by weight of acrylonitrile, |
| | 8.0% by weight of methacrylamidomethylene carbamic acid-1-bromo-2-butyl ester. |

The emulsions were used as binders for casein-based surface lacquers in the dressing of leather. Polymers F and G were far superior to product E in their resistance to solvents (acetone) and in their resistance to ironing. The leathers dressed with polymers such as these showed an outstanding surface gloss and has a pleasant, dry feel.

EXAMPLE 3

The following mixture is polymerized in aqueous emulsion under the conditions described with reference to comparison test 1:

Polymer H

| | |
|---|---|
| Water | 750 ml. |
| Nonylphenol polyglycol ether | 10 g. |
| Butylacrylate | 285 g. |
| Methylmethacrylate | 50 g. |
| Acrylonitrile | 125 g. |
| Methacrylic acid | 15 g. |
| Methacrylamidomethylene carbamic acid-1-chloro-2-propyl ester | 25 g. |

After 12 hours, the emulsion has a solids content of 40 percent by weight, corresponding to a conversion of 100 percent of the theoretical. Samples of the emulsion are adjusted to pH 2 and pH 9 and cast into films. After drying at room temperature, the films are resistant to organic solvents such as acetone, ethyl acetate, toluene and dimethyl formamide.

In addition, they are also completely waterproof and have an outstanding surface gloss. Coatings on metal surfaces are distinguished by their outstanding adhesion and elasticity.

EXAMPLE 4

A solution of 100 g. of the sodium salt of a long-chain alkylsulfonic acid containing from 12 to 18 carbon atoms in the alkyl radical and 5 g. of tert.-dodecylmercaptan is introduced into a 7-liter capacity pressure vessel in which the air is replaced by nitrogen. Twenty percent by weight of a mixture of 1,000 g. of butadiene, 600 g. of ethyl acrylate, 340 g. of acrylonitrile and 60 g. of methacrylamidomethylene carbamic acid-1-chloro-2-butyl ester are then pumped in, followed by the successive introduction of a solution of 5 g. of sodium pyrosulfite in 100 ml. of water and of a solution of 20 g. of potassium persulfate in 400 ml. of water. After polymerization has started, pumping in of the monomer mixture is resumed and polymerization is continued up to a solids content of 40 percent by weight. The latex is discharged, admixed with 20 g. of 2,2'-methylene-bis-(4-methyl-6-cyclohexyl phenol) as an antioxidant and residual monomers are removed therefrom by stirring. Samples of the emulsion are adjusted to pH 2, 7 and 9 and cast into films. After drying at room temperature, these films are swollen in dimethyl formamide. The following percentage swellings are determined as in example 1.

|  | pH 2 | pH 7 | pH 9 |
| --- | --- | --- | --- |
| Percentage swelling | 234 | 284 | 300 |

EXAMPLE 5

The following monomer mixtures are polymerized as described with reference to comparison test 1, and the following percentage swellings are obtained:

| Polymer | I | K | L |
| --- | --- | --- | --- |
| Butyl acrylate | 45 | 60 | 65 |
| Styrene | 45 | 13 |  |
| 2-Hydroxypropyl methacrylate |  | 20 |  |
| Methacrylamide | 2.5 |  |  |
| Methacrylamido-N-methylol methyl ether |  | 2 |  |
| Vinyl acetate |  | 15 |  |
| Vinyl chloride |  |  | 15 |
| Methacrylamidomethylene-carbamic acid-2-chloroethyl ester | 7.5 | 5 |  |
| Methacrylamidomethylene carbamic acid-1-chloro-2-propyl ester |  |  | 5 |
| Percentage swelling | 285 | 370 | 430 |

We claim:
1. An aqueous, cross-linkable copolymer dispersion wherein said copolymer is a copolymer of
   A. from 0.5 to 30 percent by weight of an α, β-unsaturated acylaminomethylene carbamic acid ester of the formula

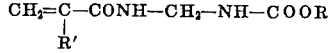

wherein R' is hydrogen or methyl and R is chloroalkyl having from two to six carbon atoms and from one to three chlorine atoms or bromoalkyl having from two to six carbon atoms and from one to three bromine atoms and
   B. from 99.5 to 70 percent by weight of at least one monomer of the group consisting of methylmethacrylate, ethylacrylate, butylacrylate, 2-hydroxypropylacrylate, 2-hydroxypropylmethacrylate, 2-aminoethylacrylate hydrochloride, 2-aminoethylmethacrylate hydrochloride, methacrylic amide, methacrylamido-N-methylol methyl ether, methacrylic acid, acrylonitrile, vinyl acetate, styrene, butadiene and isoprene.

2. A leather dressing agent consisting essentially of an aqueous cross-linkable copolymer dispersion wherein said copolymer is a copolymer of
   A. from 0.5 to 30 percent by weight of an α, β-unsaturated acylaminomethylene carbamic acid ester of the formula

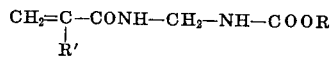

wherein R' is hydrogen or methyl and R is chloroalkyl having from two to six carbon atoms and from one to three chlorine atoms or bromoalkyl having from two to six carbon atoms and from one to three bromine atoms and
   B. from 99.5 to 70 percent by weight of at least one monomer of the group consisting of methylmethacrylate, ethylacrylate, butylacrylate, 2-hydroxypropylacrylate, 2-hydroxypropylmethacrylate, 2-aminoethylacrylate hydrochloride, 2-aminoethylmethacrylate hydrochloride, methacrylic amide, methacrylamido-N-methylol methyl ether, methacrylic acid, acrylonitrile, vinyl acetate, styrene, butadiene and isoprene.

* * * * *